United States Patent [19]
Lambert et al.

[11] Patent Number: 5,800,615
[45] Date of Patent: Sep. 1, 1998

[54] FLAT LINE POWDER COATING SYSTEM

[75] Inventors: Peter G. Lambert, Chagrin Falls; John Binder, Lorain, both of Ohio; Ivan E. Frost, Chesire, England; Stephen F. Brattoli, Jr., Elyria; Eric P. Fritz, Amherst, both of Ohio

[73] Assignee: Nordson Corporation, Westlake, Ohio

[21] Appl. No.: 593,878

[22] Filed: Jan. 30, 1996

Related U.S. Application Data

[63] Continuation of Ser. No. 120,971, Sep. 13, 1993, abandoned, which is a continuation-in-part of Ser. No. 57,849, May 7, 1993, abandoned.

[51] Int. Cl.$^6$ ............................................. B05B 1/28
[52] U.S. Cl. .................. 118/326; 118/315; 118/309; 118/629
[58] Field of Search .................. 118/326, 634, 118/641, 630, 629, 313, DIG. 7, 624, 627, 712; 361/228; 454/50, 51, 66; 55/DIG. 46; 198/339.1

[56] References Cited

U.S. PATENT DOCUMENTS

| | | | |
|---|---|---|---|
| 2,854,946 | 10/1958 | Norris | 118/324 |
| 3,017,512 | 1/1962 | Wolbert | 250/349 |
| 3,424,129 | 1/1969 | Peeps et al. | 118/314 |
| 3,874,240 | 4/1975 | Rembaum | 374/162 |
| 4,071,192 | 1/1978 | Myers | 239/3 |
| 4,090,666 | 5/1978 | Peck | 239/692 |
| 4,129,781 | 12/1978 | Doyle | 250/341.3 |
| 4,180,844 | 12/1979 | Peck | 361/226 |
| 4,311,392 | 1/1982 | Yazaki et al. | 356/375 |
| 4,399,945 | 8/1983 | Ruud | 239/697 |
| 4,456,379 | 6/1984 | Schumann et al. | 356/381 |
| 4,549,079 | 10/1985 | Terasaka et al. | 250/339.11 |
| 4,748,329 | 5/1988 | Cielo et al. | 250/559.28 |
| 4,798,340 | 1/1989 | Vohringer et al. | 239/692 |
| 4,901,666 | 2/1990 | Nagasaka et al. | 118/634 |
| 4,987,001 | 1/1991 | Knobbe et al. | 427/478 |
| 5,017,869 | 5/1991 | Oliver | 324/230 |
| 5,057,781 | 10/1991 | Atkins et al. | 324/635 |
| 5,062,298 | 11/1991 | Falcoff et al. | 73/597 |
| 5,075,622 | 12/1991 | Konii et al. | 324/229 |
| 5,091,647 | 2/1992 | Carduner et al. | 250/339.09 |
| 5,176,755 | 1/1993 | Winkle, Sr. et al. | 118/634 |
| 5,178,679 | 1/1993 | Joseffson | 118/309 |
| 5,355,083 | 10/1994 | George et al. | 324/229 |

FOREIGN PATENT DOCUMENTS

| | | |
|---|---|---|
| 0402527A2 | 12/1989 | European Pat. Off. . |
| 0405164A2 | 5/1990 | European Pat. Off. . |
| 0516462A1 | 12/1992 | European Pat. Off. . |
| 2332067 | 11/1976 | France . |
| 2588780 | 4/1987 | France . |
| 3840507A1 | 6/1990 | Germany . |
| 1143908 | 6/1989 | Japan . |
| 1278342 | 6/1972 | United Kingdom . |
| 1534096 | 11/1978 | United Kingdom . |
| 2217835 | 1/1989 | United Kingdom . |
| WO8501894 | 5/1985 | WIPO . |
| WO8904882 | 6/1989 | WIPO . |

*Primary Examiner*—Laura Edwards
*Assistant Examiner*—Calvin Padgett
*Attorney, Agent, or Firm*—Calfee, Halter & Griswold LLP

[57] ABSTRACT

Apparatus and methods for coating an article on a flat line, powder coating system comprises a powder coating booth with a reduced inlet opening for articles to be coated and an enlarged outlet opening for coated articles. Powder spray guns of the tribo-electric type, or having internal charging electrodes, are arranged in rows with parallel tube spray heads and are disposed at a shallow angle with respect to the conveyor to spray powder onto the articles generally in the direction of conveyor movement. Baffle plates are installed under the spray guns so that any powder which collects on the spray guns does not fall on the articles being coated. Oversprayed powder is collected from a part of the booth intermediate the spray guns and the enlarged outlet opening. Preferably, the thickness of powder coating on the articles in the precured condition is measured and the system is controlled so that the coating thickness is uniform and of the desired thickness.

21 Claims, 6 Drawing Sheets

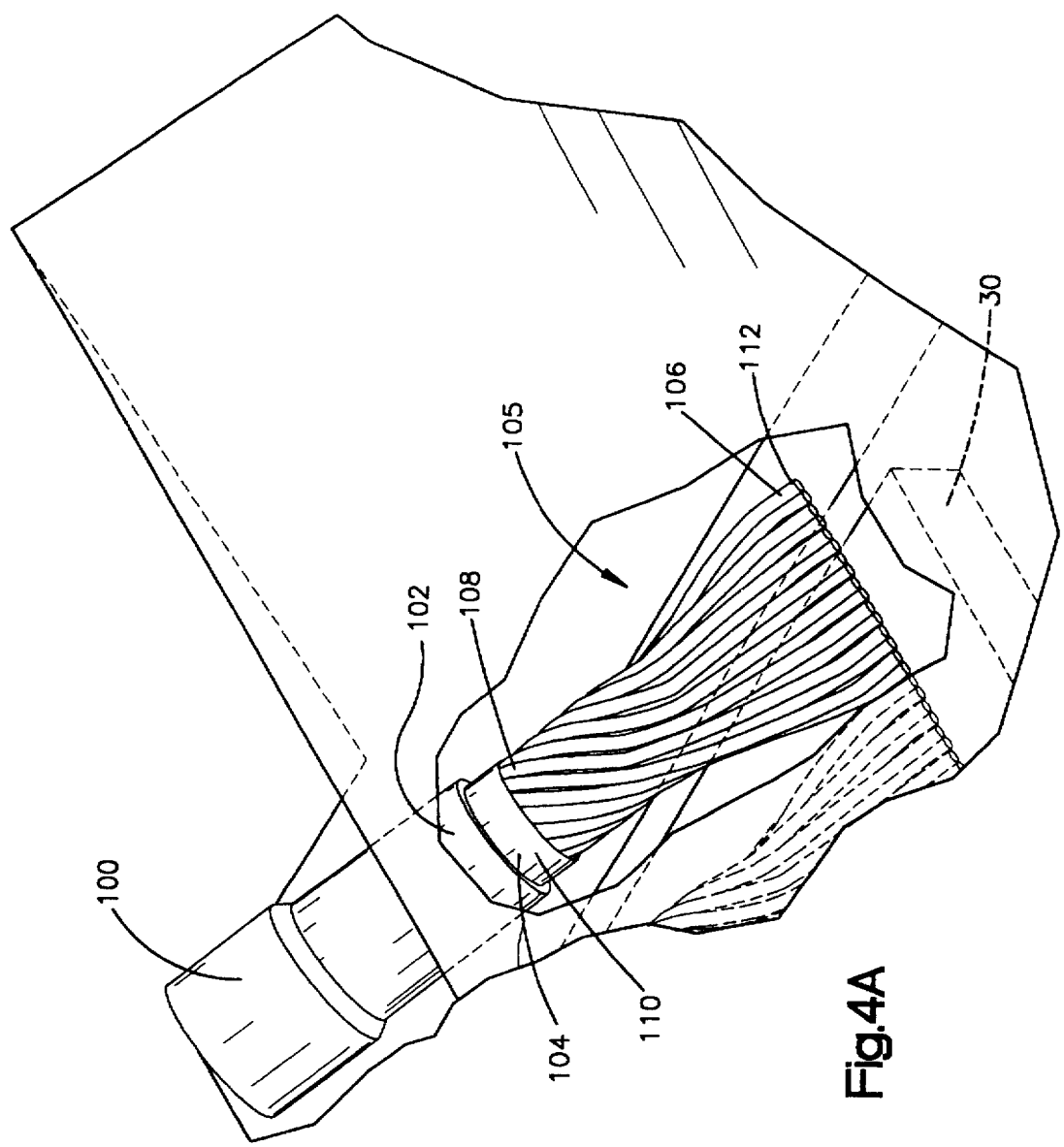

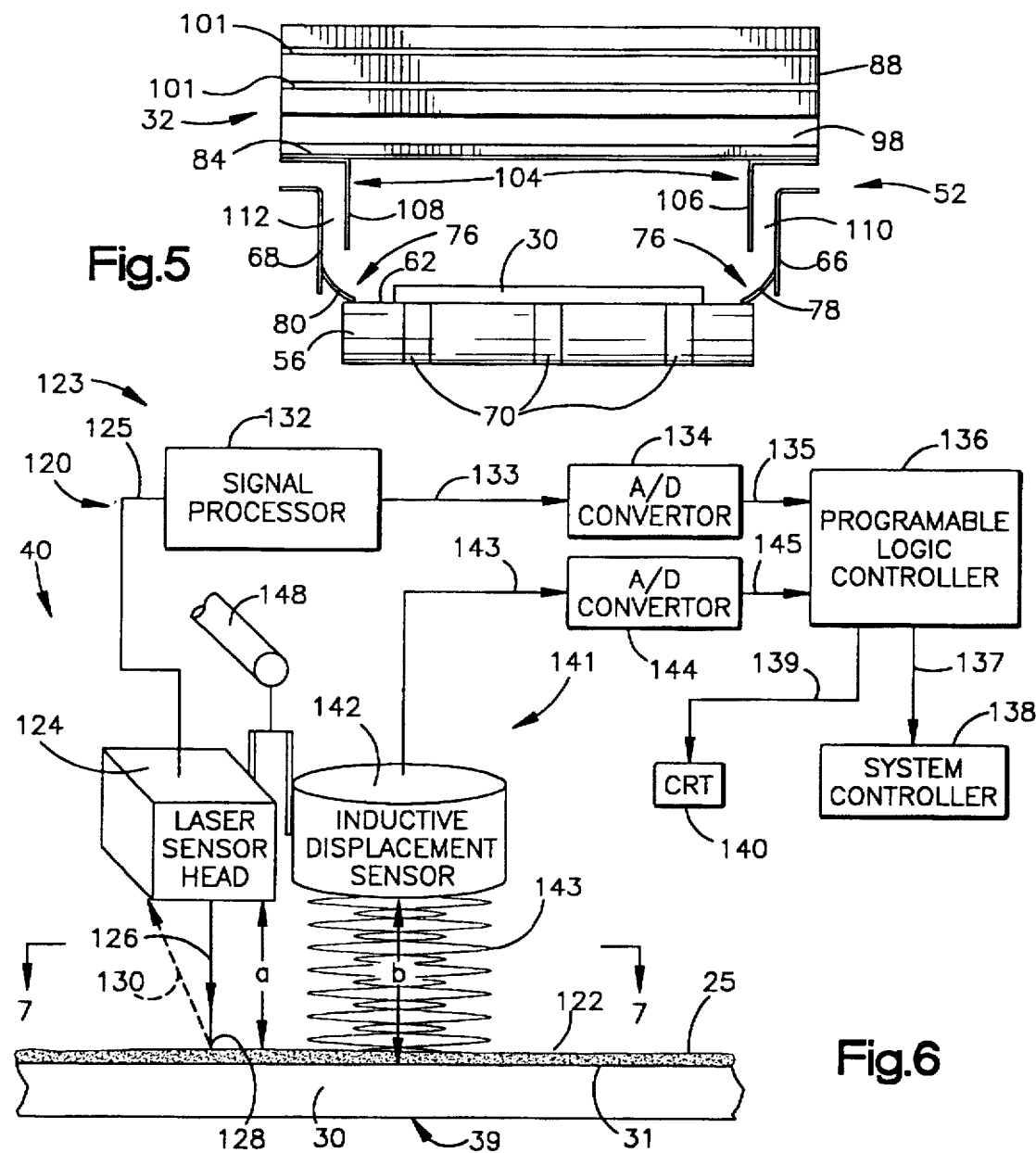
Fig.5
Fig.6
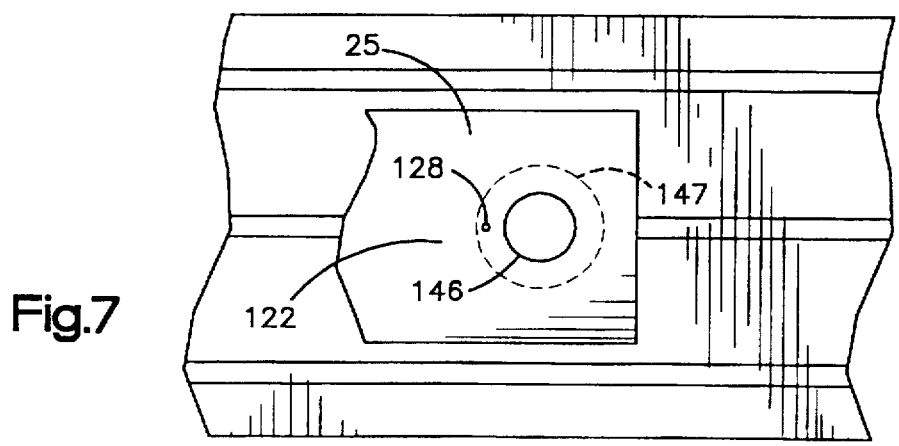
Fig.7

FLAT LINE POWDER COATING SYSTEM

This is a continuation of application Ser. No. 08/120,971 filed on Sep. 13, 1993, now abandoned, which is a continuation in part of Ser. No. 08/057,849, filed May 7, 1993, now abandoned.

FIELD OF THE INVENTION

This invention relates to the field of electrostatic powder coating of a part or article. More particularly, the invention relates to a flat line, powder coating system and method of operating the system for spraying a coating of powder on a part, article, or continuous strip of material such as a metal coil, and in the most preferred embodiment, subsequently measuring the thickness of the powder coating while the powder is still in a precured condition.

BACKGROUND OF THE INVENTION

Powder booths for electrostatic application of powder materials to continuous flat strips or individual parts or articles of metal typically include a spray booth and a conveyor for carrying the article to be sprayed through the spray booth, as discussed in U.S. Pat. No. 4,901,666 ('666). In prior art flat line, electrostatic powder spray systems of the type illustrated in FIG. 1, the coating powder 8 was typically applied by at least one corona type spray gun 10 disposed perpendicular to the surface 11 of an electrically grounded article 12 being spray coated. The perpendicular orientation of spray gun 10 to surface 11 of article 12 was important so that electrostatic field 14, generated by an external electrode (not shown) in spray gun 10, was uniform with respect to article 12. This insured that a uniform umbrella of charged coating powder 8 was sprayed towards electrically grounded article 12. As long as article 12 was transported by a conveyor 16 at an operating speed of about ten to about twenty five feet per minute (fpm), as was common in the prior art coating systems, the corona spray gun 10 was able to provide an adequately uniform coating 18. To better insure the uniformity of coating 18, spray gun 10 could be incorporated in groupings of identical guns and/or the gun(s) could be oscillated in a direction transverse to the direction of movement of conveyor 16.

With the present emphasis on increasing production efficiency while lowering production costs, there is a continuing effort to increase the speed of conveyor 16 to a range between about thirty five fpm and two hundred fpm. When conveyor 16 is operating at these higher speeds, the particles of powder 8 moving normal to surface 11 of part 12 being coated, must be able to adhere to a fast moving surface 11. Using one or more prior art external electrode corona-type, powder coating guns 10, positioned as illustrated in FIG. 1, the operational speed of conveyor 16 was limited to between about ten fpm and twenty five fpm, because a uniform coating 18 was not achievable at the higher speeds.

To increase the operational speed of conveyor 16 the inventor in the present case initially positioned guns 10 at a shallow angle, spraying position shown in FIG. 2. However given the corona-type, powder coating gun 10 which were being utilized, the electrostatic field 14 between nozzle 20 of gun 10 and the electrically grounded article 12 is skewed under gun 10 towards article 12, and is not symmetrical with respect to the longitudinal center line of the gun. Since particles of powder 8 are sprayed at a relatively high velocity, they spray out of nozzle 20 at a different angle than that of the skewed electrostatic field 14. The result is that the particles of powder 8 do not pass through the field of charging ions produced by the external changing electrode and therefore do not become effectively charged. As a result they are primarily influenced by aerodynamics instead of electrostatic field 14. Without electrostatic field 14 directing the particles of coating powder 8 towards the surface 11 of article 12 being sprayed, the result was a nonuniform coating 18 and too much overspray.

Once the powder is sprayed onto the part, it would be useful to measure the thickness of the powder coating while the powder is still in a precured condition. However, since precured coating powder is still just a layer of loose particles, it cannot be physically touched without disturbing the coating thickness. While the prior art, as shown for example in U.S. Pat. Nos. 4,456,379, 5,017,869 and 5,075,622, does show measuring the thickness of a film with various devices and techniques, none of the prior art shows measuring a coating powder while it is still in a precured condition. The ability to conveniently measure the thickness of a precured coating powder is extremely important in high speed operations to insure that the thickness of the powder remains uniform and is of a desired thickness. In the event that the coating is nonuniform or not of the desired thickness, it is advantageous to correct the problem before the coating is cured so that the powder can be blown off of the part with air and the part can simply be recoated without having to be stripped or thrown away.

OBJECTS AND SUMMARY OF THE INVENTION

It is an object of the present invention to provide a flat line, powder coating system wherein the article being powder coated can be quickly transferred through the system and coated with a uniform powder coating to obviate the problems and limitations of the prior art systems.

It is a further object of the present invention to provide a flat line, powder coating system which electrically grounds the article being powder coated without causing a buildup of powder on a conveyor transporting the article through the coating system.

Still another object of the present invention to provide a flat line, powder coating system wherein a plurality of powder coating guns are arranged in several rows, each row having the guns located next to each other so that a coating with a uniform thickness can be applied onto each article being coated.

It is another object of the present invention to provide a flat line, powder coating system with a precured powder thickness sensor which continuously measures the thickness of the powder in the precured condition.

It is a still another object of the present invention to provide a flat line, powder coating system which uses triboelectric or internal charge powder coating guns disposed at a shallow angle with respect to the conveyor transporting the articles to be coated through a coating spray booth.

In accordance with the invention, there is provided a flat line, powder coating system comprising a device for delivering an article to a powder coating booth and a conveyor means for transferring the article therethrough. A plurality of spray guns apply a layer of powder coating material to the article being transferred through the powder coating booth and an exhaust system collects powder overspray within the powder coating booth. Preferably a powder coating sensor means measures the thickness of the layer of powder coating material on the article while it is still in the precured condition.

Also in accordance with the invention, each spray gun is positioned at an angle with respect to the conveyor and includes means for charging the powder upstream of the spray nozzle either triboelectrically or by means of internal changing electrodes. Preferably, the guns are positioned at a shallow spray angle of between about five degrees and forty five degrees with respect to the conveyor to orient the spray nozzle generally in the direction which the article is traveling. In one preferred embodiment, each of the spray guns has a plurality of parallel longitudinally extending flow tubes connected to its downstream end for spraying a uniform, horizontal pattern of powder coating material to form the coating layer on the article. The spray guns can be disposed adjacent to each other so that a line of the flow tubes equally spaced from one another are arranged across the width of the conveyor.

Another aspect of the invention relates to a powder thickness sensor adapted to measure the thickness of a layer of powder coating material deposited on a surface of an article while the coating material is still in the precured condition. The thickness sensor comprises a first sensor, preferably a laser sensor, positioned adjacent the article for measuring a first distance from the sensor to a top surface of the layer of powder coating material deposited on the article and generating a signal corresponding to the first distance. The thickness sensor also includes a second sensor, preferably an eddy current/inductance sensor, which is secured to the first sensor for measuring a second distance from the second sensor to the surface of the article and for generating a signal corresponding to the second distance. Signal processor and a logic controller are provided for receiving the signals from these sensors and subtracting them from each other whereby the thickness of the layer of powder coating material can be determined.

Further in accordance with the invention, the system includes a low profile, powder coating booth having an entry opening at one end and an exit opening at the other end. The conveyor means includes at least first and second rollers disposed outside of the powder coating booth and adjacent the entry and exit openings, respectively, and a conveyor belt mounted on the first and second rollers so that an upper portion of the belt travels through the powder coating booth. A seal structure disposed between opposite sides of the booth and the upper portion of the conveyor belt prevents oversprayed powder coating material from leaking between the side walls of the powder coating booth and the upper portion of the conveyor belt.

In accordance with the invention, a method of coating an article in a flat line, powder coating system, comprises the following steps. An article is transferred through a powder coating booth and a layer of powder coating material is applied to the article being transferred therethrough. Powder overspray is exhausted from within the powder coating booth and the thickness of the layer of powder coating material on the article is measured while the coating material is still in a precured condition. Also, in accordance with the method, the layer of powder coating material is applied to the article by a plurality of spray guns positioned in a row. Each of the spray guns includes means for changing the powder upstream of the spray nozzle and has a plurality of flow tubes arranged side by side. The spray guns are disposed at an angle with respect to the conveyor and article being coated and the powder is sprayed generally in the direction of travel for spraying a uniform, horizontal pattern of powder coating material onto the article.

According to the invention, a method of measuring the thickness of a layer of powder coating material deposited on a surface of an article comprises the following steps. A first distance from a first sensor to a top surface of the layer of powder coating material deposited on the article is measured and a signal corresponding to the first distance is generated. Then, a second distance from second sensor to the surface of the article is measured and a signal corresponding to the second distance is generated. Next, the signals are subtracted from each other to determine the thickness of the layer of powder coating material. The method also includes the steps of generating a control signal corresponding to the thickness of the layer and directing the control signal to a system controller to control the application of the powder coating material to the article.

According to an additional preferred embodiment of the invention, a flat line, powder coating system includes a powder coating booth having a restricted entry opening at one end for the article to be coated and an enlarged exit opening, being larger than the restricted opening, at the other end for the article to exit once it has been coated. Two or more powder coating guns are disposed in rows. Means disposed within the powder coating booth draws air through the restricted entry opening and enlarged exit opening. The air extracts the oversprayed powder coating material from the booth without disturbing the flow pattern of powder coating material being sprayed from the powder coating guns. The means for drawing air includes exhaust ports adjacent opposite sides of a conveyor belt.

In accordance with an additional embodiment, a baffle plate is disposed under each of row of powder coating guns and above the article being coated for maintaining good alignment of the powder coating guns and preventing oversprayed powder coating material which collects on the coating guns from falling onto the article. Means are provided for mounting the baffle plates so that the row of powder coating guns and corresponding baffle plate can be removed from the powder coating booth as a single assembly for cleaning and/or maintenance.

BRIEF DESCRIPTION OF THE DRAWINGS

The structure, operation, and advantages of the presently preferred embodiment of the invention will become further apparent upon consideration of the following description taken in conjunction with the accompanying drawings, wherein:

FIG. 1 is a schematic illustration showing the electrostatic field of a prior art, corona-type electrostatic spray gun positioned with respect to an article being sprayed;

FIG. 2 is a schematic illustration of a corona-type electrostatic spray gun positioned at a shallow angle with respect to an article carried on a conveyor showing the effect on the electrostatic field and the particles of powder;

FIG. 3 is a schematic illustration of a flat line, powder coating system with a powder coating booth section, a precured powder thickness sensing section, and a curing section in accordance with the invention;

FIG. 4 is a perspective, cutaway view of a flat line, powder coating booth with rows of coating guns projecting into the booth, in accordance with one embodiment of the invention;

FIG. 4A is a detailed perspective view of the parallel flow tubes attached to the downstream end of a coating gun as shown in the dotted circle in FIG. 4;

FIG. 5 is a view taken along line 5—5 of FIG. 4, with the spray guns removed, illustrating the inlet section of the powder coating booth including a seal assembly engaging the upper conveyor belt;

FIG. 6 is a schematic illustration of a precured powder thickness sensor, in accordance with the invention;

FIG. 7 is a view taken along line 7—7 of FIG. 6 which has been reduced in size;

DETAILED DESCRIPTION OF THE INVENTION

Figure 3:
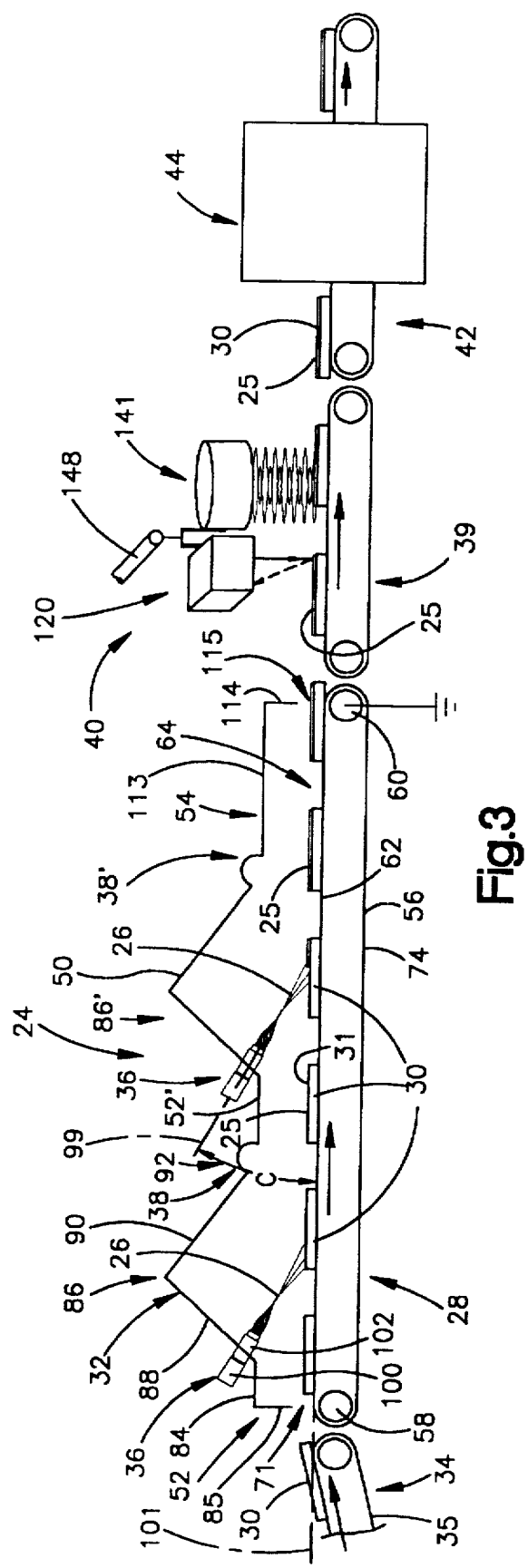

Referring to FIG. 3, a schematic illustration of a flat line, powder coating system 24, intended for applying powder coating material 26 on a production line basis, includes conveyor means 28 for transferring an article or part 30 to be coated through a powder coating booth 32. Means 34, such as a conventional conveyor device 35, is provided for delivering article 30 to conveyor means 28. Means 36 applies a layer 25 of powder coating material 26 to article 30 being transferred through powder coating booth 32 and means 38 collects powder overspray within powder coating booth 32. A conveyor means 39 is provided for transferring article or part 30, subsequent to being powder coated, from conveyor means 28. A powder coating sensor means 40, located above conveyor means 39, measures the thickness of layer 25 of precured coating powder material 26 deposited on surface 31 of article 30. Then article 30 is transferred to a conveyor system 42 and carried through an oven 44 to melt coating powder material 26. Finally, article 30, coated with cured powder coating material 26, moves out of oven 44 for cooling.

Figure 4:
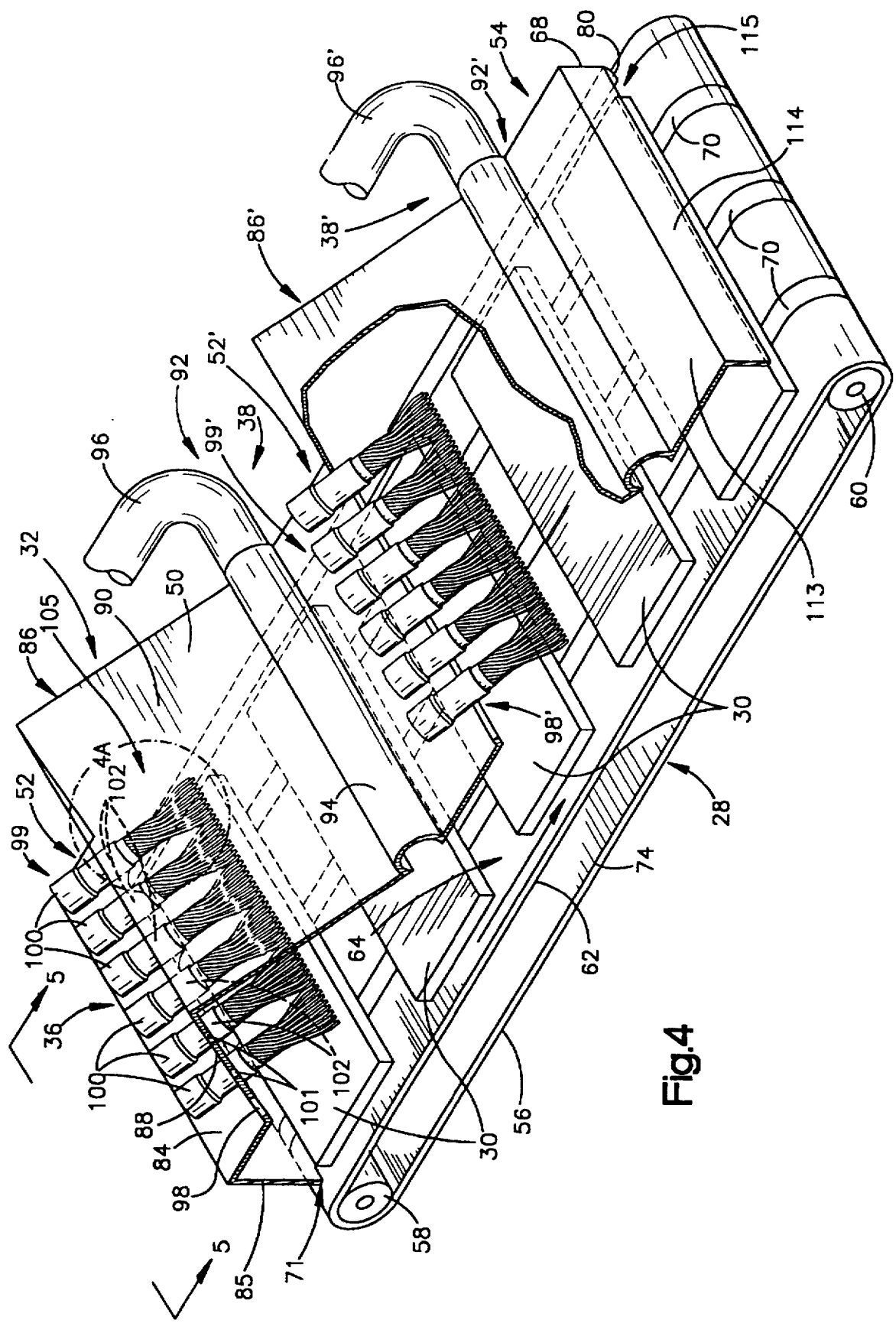

Referring to FIG. 4, there is illustrated a cutaway perspective view of powder coating booth 32. Booth 32 itself has a unique, low profile design and includes a canopy 50 supported above conveyor means 28 and having entry and exit sections 52 and 54, respectively, at opposite ends thereof through which the article or part 30 to be coated is carried into and out of booth 32. Conveyor means 28 includes a conveyor belt 56 disposed about first and second cylindrical rollers 58 and 60, respectively, disposed outside of booth 32 and adjacent entry and exit sections 52 and 54. At least one of the rollers 58 or 60 is a drive roller and is electrically grounded. The upper section 62 of belt 56 forms the bottom 64 of powder coating booth 32. Conveyor belt 56 is located with respect to canopy 50 so that powder 26 cannot escape from coating booth 32 through the space between the opposite sidewalls 66 and 68 of canopy 50 and upper portion 62 of belt 56, as is described below with respect to FIG. 5. Belt 56 includes a plurality of semiconductive, continuous strips 70 in spaced, parallel relation to each other which are adapted to be electrically grounded to rollers 58 and 60. Articles 30 make contact with strips 70 and are thereby grounded while travelling through the powder coating booth. Belt 56 can be constructed of a flexible, polynitrile, base material with strips 70 of carbon fiber bonded to the surface of the base material.

One aspect of the invention relates to conveyor belt 56 being mounted on rollers 58, 60 so that upper portion 62 of belt 56 travels through powder coating booth 32 and a lower portion 74 of belt 56 travels outside of booth 32. Means 76, as seen in FIG. 5, is disposed between opposite sides 66, 68 of booth 32 and upper portion 62 of conveyor belt 56 and prevents oversprayed coating powder material 26 from escaping between upper portion 62 of conveyor belt 56 and sides 66 and 68 of booth 32. Means 76 includes first and second strips 78 and 80 of stiff material, such as the base material of which conveyor belt 56 is formed. Strips 78 and 80 are secured at one end to sides 66 and 68, respectively, of spray booth 32 and an opposite end rests against upper portion 62 of belt 56. Strips 78 and 80 extend the length of booth 32 and in combination with overspray collection channels 110, 112 (later described) prevent the powder coating material from escaping between sides 66 and 68 of booth 32 and upper portion 62 of belt 56.

The shape of canopy 50 is another significant feature of low profile, powder coating booth 32. As shown in FIGS. 3, 4, and 5, canopy 50 includes a first substantially rectangular shaped, entry section 52 which is provided at one end of booth 32. Rectangular shaped, entry section 52 has a top wall 84, side walls 66 and 68, and end wall of 85. An inlet opening 71 to entry section 52 can be relatively low as long as flat article 30 can pass therethrough. Directly downstream and adjacent to rectangular entry section 52 is a generally triangular shaped spray section 86. Triangular shaped spray section 86 has an upstream, upwardly inclined wall 88 disposed at an angle of between about 120 degrees to about 150 degrees with respect to top wall 84 of entry section 52 and a downstream wall 90 which abuts and is disposed at about a ninety degree angle with respect to upstream wall 88. While the range of angles of triangular section 86 form the preferred embodiment, it is within the terms of the invention to change the angles of triangular section 86 depending on the air flow required to keep powder coating material 26 from sticking to the inside surfaces of walls 88, 90 of triangular section 86. At the downstream end of triangular section 86 is means 38 for collecting powder overspray which includes an overspray exhaust section 92. Section 92 can be a semicircular shaped chamber 94 abutted against the lower end of downstream wall 90. Overspray exhaust section 92 extends across the width of canopy 50 and is connected at one end to an exhaust duct 96 which has a provision for automatic recovery and recirculation of the oversprayed powder from system 10. Exhaust duct 96 typically includes a large fan which draws air and oversprayed powder from powder coating booth 32. An exit opening 115 is provided in canopy 50 to allow coated parts to exit the booth.

A longitudinal slot 98 is provided at the intersection of the top wall 84 of entry section 52 and upwardly inclined wall 88 of triangular section 86. Slot 98 extends the width of canopy 50 between side walls 66 and 68. The means 36 for applying powder coating material 26 includes a plurality of spray guns 100 which are generally located out of the powder coating booth 32 but whose barrels 102 project into coating booth 32 through slot 98. Locating the guns 100 outside of the powder coating booth 32 prevents powder coating from building up on guns 100 and falling on articles being coated.

Another aspect of the invention is the provision of a plurality of spaced, parallel slots 101, extending in a transverse direction to the direction of movement through the coating booth 32. Preferably, spaced parallel slots 101 extending the width of canopy 50. Slots 101 can include conventional means to adjust their width. The combination of the air flow into the booth through slots 101, inlet opening 71, exit opening 115 and slot 98, and air flow drawn out of the booth by air flow channel means 104, described below, and exhaust ducts 86 acts to prevent oversprayed coating material from collecting on the inside surfaces of canopy 50.

Referring to FIG. 5, air flow channel means 104 are disposed above strips 78 and 80 along their entire length on opposite sides of and above conveyor belt 56. A fan is associated with these channels 109 to draw oversprayed powder out of the booth. Channel means 104 includes parallel walls 106 and 108 which are spaced from sidewalls 66 and 68, respectively, and which extend the length of spray powder coating booth 32 (not explicitly shown) to form air inlet channels 110 and 112. The air flow through channels 110 and 112 passes over strips 78 and 80 to bias them against upper section 62 of belt 56 to insure a seal between conveyor 56 belt and side walls 66 and 68 of powder coating booth 32.

Canopy 50 can further include a second substantially rectangular shaped entry section 52' located directly downstream from overspray exhaust section 92 and attached thereto. Throughout the specification, primed and double primed numbers represent structural elements which are substantially identical to structural elements represented by the same unprimed number. Directly downstream and adjacent to rectangular entry section 54' is a generally triangular shaped spray section 86'. A second row 99' of guns 100' project into canopy 50 through a slot 98' between entry section 52' and spray section 86'. At the downstream end of triangular section 86' is a means 38' for collecting overspray which includes an overspray exhaust section 92' and an exhaust 96'. Exhaust 96' is typically joined to exhaust 96. Directly downstream and adjacent to overspray exhaust section 92' is rectangular exit section 54. Exit section 54 includes a top wall 113, sidewalls 66 and 68 and an end wall 114. Exit opening 115 allows flat articles 30 to pass therethrough.

Oversprayed powder which is not withdrawn from the booth through channels 110, 112 or exhaust ducts 96, 96' will adhere to the conveyor 28. This powder can be vacuumed off of the underside 74 of belt 56 using a device such as that shown in the 4,901,666 patent, which is hereby incorporated by reference in its entirety.

One feature of this invention is the construction and placement of the plurality of rows 99 and 99' of spray guns 100, 100' which project into canopy 50 through slots 98 and 98'. Each gun includes means for charging the powder upstream of the spray nozzle. For example, a gun having an internal charging electrode such as is shown in U.S. Pat. No. 4,227,652, which is hereby incorporated by reference in its entirety, could be used. Preferably, however each gun 100, 100' is a triboelectric coating gun, of the type describe and illustrated in U.S. Pat. No. 4,399,945, which is also hereby incorporated by reference in its entirety. Even more preferably each gun 100, 100' would be a Tribomatic II gun available from Nordson Corporation, Amherst, Ohio, described in U.S. Pat. No. 5,344,080 which is also hereby incorporated by reference in its entirety. Since guns 100 and 100' are substantially identical in construction, only gun 100 is discussed in detail. With reference to FIG. 4A, each gun 100 has a tubular barrel 102 terminating at a discharge end 104. A grouping 105 of parallel, longitudinally extending, identical flow tubes 106 are joined at a first end 108 to common cylindrical inlet 110 which in turn is attached to discharge end 104 of triboelectric coating gun 100. The second opposite end 112 of each flow tube 106 can include a nozzle or spray head (not shown). Flow tubes 106 are disposed next to each other in abutting relation for spraying a uniform, horizontal pattern of coating powder onto article 30. Tubes 106 are preferably constructed of a plastic material, such as for example TEFLON, for maintaining the electrostatic charge on the powder generated within the gun 100.

Typically, a plurality of triboelectric coating guns 100 are disposed adjacent to each other and aligned in a horizontal extending line so that parallel flow tubes 106 of each gun 100 are aligned with each other and so that flow tubes 106 are substantially equally spaced from each other. That is, the outer end tubes 106 of each grouping 105 are equally spaced from adjacent tubes of adjacent guns 100 located on either side thereof. The placement of tubes 106 effectively results in a continuous nozzle which insures uniform spray coverage all across part 30.

One feature of the invention, as illustrated in FIG. 3, is the shallow spray angle "c" at which a longitudinal axis 99 through guns 100 and flow tubes 106 is disposed with respect to the plane of the top surface 62 of conveyor means 28. Preferably, guns 100 are disposed adjacent conveyor belt 56 for spraying powder material 26 onto article 30 at a spray angle of less than sixty degrees and typically between about five degrees and forty five degrees with respect to conveyor 62 and spray powder in the direction of travel. More preferably, the angle "c" is about fifteen degrees to about twenty five degrees. When angle "c" is increased beyond forty five degrees, the end 112 of each flow tube 106, from which powder material 26 is sprayed, has to be spaced further and further from article 30 because the velocity of powder material 26 tends to cause the particles of material 26 to bounce off the surface being sprayed. As the distance from end 112 to the surface being sprayed increases, the spray pattern becomes less predictable and tends to form a nonuniform coating 25. Conversely, as the angle becomes too shallow, i.e. less than about five degrees, the powder material 26 tends to spray in a longitudinal direction and not settle on the surface of article 30. Again the spray pattern becomes less predictable and tends to form a nonuniform coating 25. Typically, the ends 112 of tubes 106 are located between 1 inch and 10 inches above the article being coated.

Figure 1:
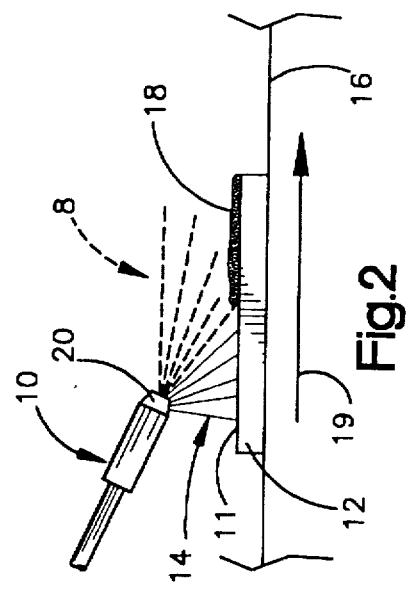
Figure 2:
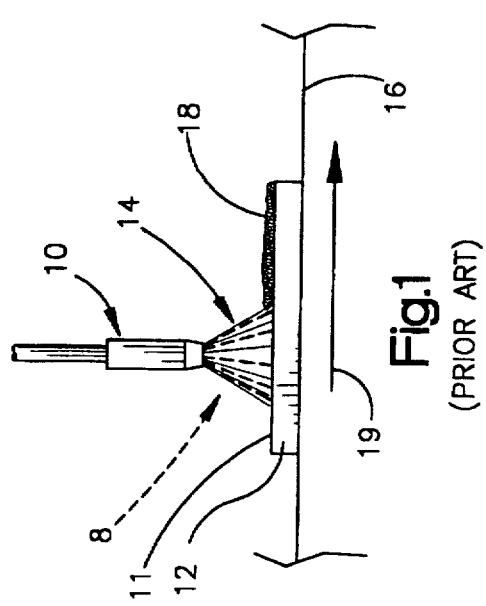

The positioning of triboelectric guns 100, 100' at a shallow angle and the charging of powder upstream from the spray nozzle in those guns overcomes the problem of spraying powder coating material 26 on articles 30 travelling on high speed conveyors, as experienced by the inventors, with angled corona guns, as discussed above. The triboelectric guns 100, 100' electrostatically charge powder material 26 simply by material 26 flowing therethrough and making contact with TEFLON® frictional charging surfaces inside the gun. No electrode at the outlet of a gun is required as is the case with the corona guns, and therefore the problems described above of a skewed electrostatic field are avoided. Another advantage of triboelectric guns 100, 100' being positioned at a shallow angle is that the spray pattern is generally wide and thin. Thus, each particle of powder material 26 is attracted towards the electrically grounded article 30 being coated. That is, the present invention allows each particle of powder material 26 to maintain a strong electrostatic attraction to the article being coated since there is in effect only a small amount of other powder material 26 between it and the surface being spray coated. The result is better transfer efficiency of the charged powder to the article compared to a FIG. 1 vertical spraying arrangement wherein a large cloud of powder is present between the particles exiting the gun and the article being coated.

Another advantage of the shallow angle is that the dwell time of the powder material 26, i.e., the time that the powder material 26 floats over article 30 and has the opportunity to become electrostatically adhered to it, increases. Therefore, the electrostatic force between the electrically grounded article and electrostatically charged powder material 26 has a longer time to attract the particles to the surface being coated. This also increases transfer efficiency. Increased transfer efficiency means less oversprayed powder coating material which must be collected and recovered, which leads to cleaner walls and ceilings of canopy 50, and less recirculation and degradation of powder coating material sprayed from the guns.

A second row 99' of spray guns 110' project through slot 98' at the intersection of the top wall 84' of entry section 54' and upwardly inclined wall 88' of triangular section 86'. Since flat line, powder coating system 10 is intended to operate at a high speed, in a range of about thirty five fpm to about two hundred fpm, the first row 99 of spray guns 100 may not be able to deposit enough powder coating material 26 to form a layer 25 having a desired thickness. Therefore, a second row 99' of guns 100' is provided downstream of first row 99 to apply a second layer of powder material 26 directly upon the upper surface of the first layer of coating material 26. While only two rows 99 and 99' of guns 100, 100', respectively, are illustrated, it is within the terms of the present invention to provide additional rows of guns extending through canopy at locations downstream from row 99' of gun 100', as desired.

When the coating 25 of article 30 is completed, article 30 moves through rectangular outlet section 54 and is transferred from conveyor belt 56 to conveyor means 39. A powder coating sensor means 40, as illustrated in FIG. 6, is located above conveyor means 39 and measures the thickness of layer 25 of coating powder material 26, still in the precured condition, which is deposited on surface 31 of article 30. Powder coating sensor means 40 includes, preferably, a laser sensor 120 positioned adjacent article 30 for measuring a first distance "a" from laser sensor 120 to top surface 122 of coating powder layer 25. Laser sensor 120, such as an LC SERIES laser displacement meter, manufactured by KEYENCE Corp. of America in Fairlawn, N.J. includes a sensor head 124 which transmits a visible, semiconductor laser beam 126 through a transmitter lens (not shown) to a position 128 on top surface 122. A reflected beam 130 from top surface 122 is picked up by a receiver lens (not shown) in sensor head 124 and a corresponding analog laser signal is generated.

The analog laser signal is directed from sensor head 124 through line 125 into signal processor 132. The processed laser signal is next directed through line 133 into an analog to digital (A/D) convertor 134. The digital value of distance "a" thereby produced is input through line 135 into a conventional Programmable Logic Controller 136.

Powder coating sensor means 40 further includes, preferably, an eddy current/inductance sensor 141 mounted with laser sensor head 124 for measuring a second distance "b" from the eddy current/inductance sensor 141 to the upper surface 31 of article 30. Eddy current/inductance sensor 141, such as an AS SERIES inductive displacement sensor, manufactured by KEYENCE Corp. of America in Fairlawn, N.J., includes an analog displacement sensor head 142 which outputs a analog, linear output voltage signal that changes according to the distance "b" between analog displacement sensor head 142 and the upper surface 31 of article 30. A resulting analog linear output current/inductive voltage signal is directed through line 143 to an A/D convertor 144 which generates a digital value of distance "b". This value is input through line 145 into Programmable Logic Controller 136. Controller 136 subtracts the "a" value from the "b" value to determine the thickness of coating 25 and provides a signal representative of the thickness to system controller 138 and/or CRT 140, as discussed in more detail below.

As illustrated in FIGS. 6 and 7, laser sensor head 124 and current/inductance sensor head 142 are secured to a linear drive device 148 which moves heads 124 and 142 back and forth transverse to the direction of movement of conveyor 39. Current/inductance sensor head 142 has a cylindrical cross section 146 and measures the average distance "b" of a circular area 147 equal to 1.8 times the diameter of sensor head 142. Laser sensor head 124 is positioned, with respect to sensor head 142, to measure distance "a" from a point 128 on surface 122 of coating 25 within circular area 147 measured by current/inductance head 142. The Programmable Logic Controller 136 subtracts the digital laser signal "a" from the digital current/inductive voltage signal "b" and generates a control signal corresponding to the thickness of coating 25 as described above. Programmable Logic Controller 136 directs the control signal through line 137 to system controller 138 which operates flat line system 10. System controller 138 can increase, decrease or completely shut off the application of powder 26 from the guns 100, 100' to provide a uniform thickness of coating 25. Since the thickness of coating 25 is constantly being monitored while the powder is still in the precured condition, an unevenly coated article 30 can be removed from the line before coating 25 is cured and part 30 has to be scrapped. Moreover, the whole line can be shut down before a large number of individual articles 30, or a long continuous strip of article 30, having a defective coating are cured.

The process of measuring the thickness of coating 25 requires Programmable Logic Controller 136 to select the appropriate signals from laser sensor head 124 and current/ inductance head 142. That is, as an individual article 30 moves in the direction of travel on conveyor belt 39, the front edge of article 30 initially is sensed by current/ inductance head 142. Since the eddy current/inductance sensor 142 generates a voltage signal corresponding to the average distance to the surface of a circular area 147, the voltage signal will increase from the time a front edge of article 30 moves into measured area 147 until article 30 is located under sensor head 142 so that the circular area 147 being measured is completely positioned on coating 25. The signal from laser sensor head 124, on the other hand, accurately measures the distance to top surface 122 of coating layer 25 at the instant the coating layer of article 30 moves below the point 128 of laser beam 126. Therefore, to accurately determine the thickness of coating layer 25, the Programmable Logic Controller 136 is programmed to account for the time delay until circular area 147 is completely on article 30 being measured.

After article 30 is coated with a layer 25 of coating powder material 26 of desired thickness, but while the material 26 is still in the precured condition, the article 30 is transferred to a conveyor system 42. Then, article 30 is transferred through an oven 44 to melt and cure coating powder material 26. Finally, article 303 coated with cured powder coating material 26, moves out of oven 44 for cooling.

Figure 8:
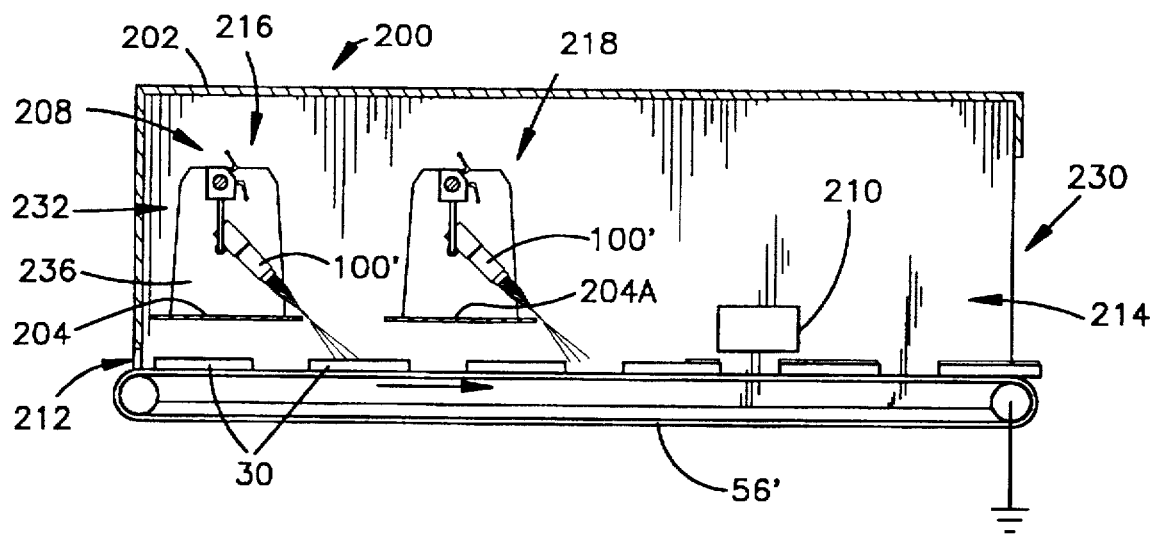
FIG. 8 is a schematic illustration, partly in cross section, of an additional preferred embodiment of a flat line, powder coating system with an alternative powder coating booth enclosing rows of coating guns, incorporating baffle plates beneath the guns, and having exhaust ports adjacent the sides of the conveyor belt.
Figure 9A:
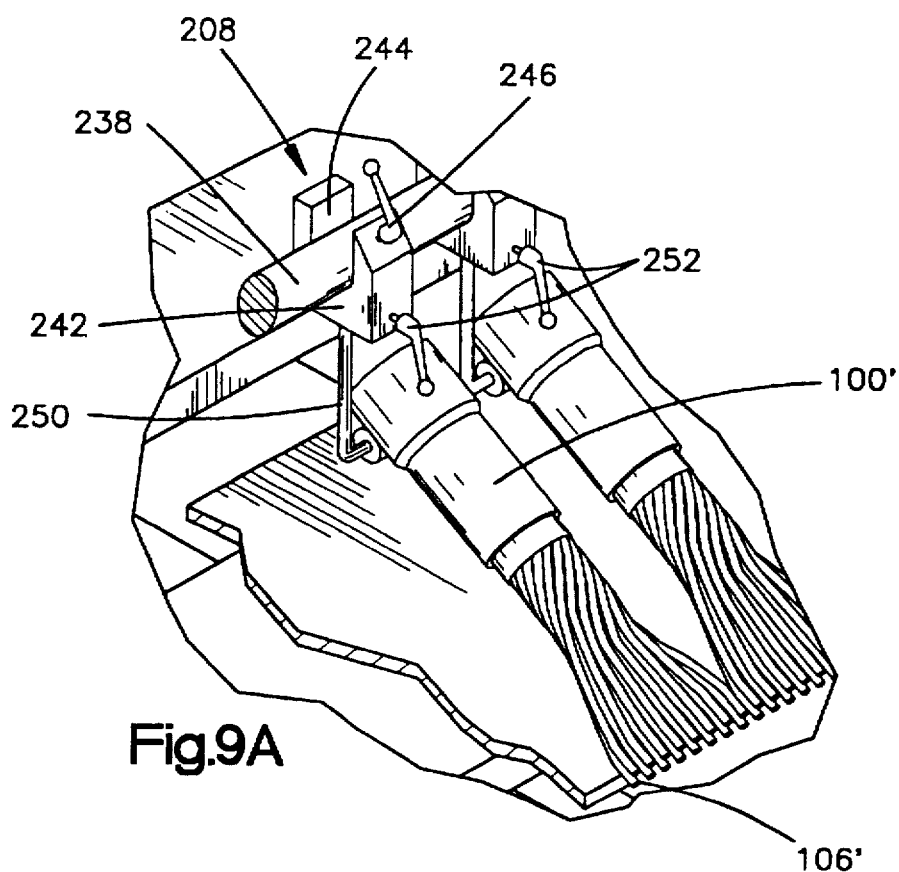
FIG. 9A is an enlarged view of area 9A in FIG. 9.
Figure 9:
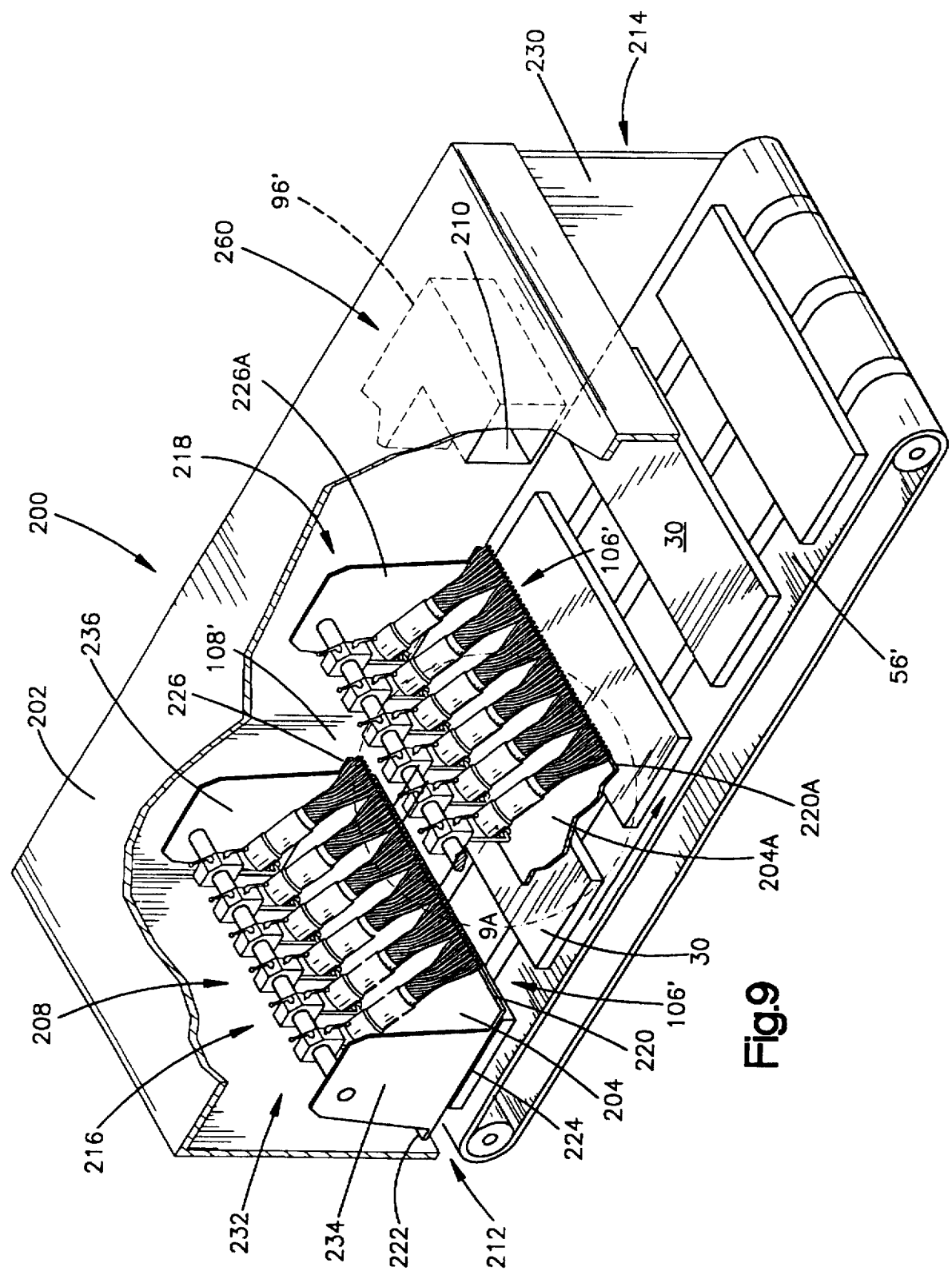
FIG. 9 is a perspective, cutaway view of the flat line, powder coating booth of FIG. 8 in accordance with the additional embodiment of the invention.

While the above described embodiment of the invention provides an effective powder coating booth 32 with several rows of spray guns 100 and 100' mounted external to canopy 50, a more preferred embodiment, as illustrated in FIGS. 8 and 9, incorporates a number of improvements relating to an improved powder coating booth 200 incorporating a canopy 202 which is shaped to accommodate the placement of spray guns 100 and 100' within booth 200, the incorporation of baffle plates 204 and 204A below each row of spray guns 100', means 208 to adjustably secure spray guns 100' to baffle plates 204 and 204A, exhaust ports 210 adjacent to opposite sides of conveyor belt 56', a restricted inlet opening 212, and an enlarged outlet opening 214. Reference numerals including a capital letter are substantially identical to elements without capital letters.

Referring to FIG. 8, a schematic illustration of a flat line, powder coating booth 200, intended for applying powder coating material on a production line basis is shown. Conveyor belt 56' is provided for transferring part 30 through canopy 202 of powder coating booth 200 for coating with powder. A number of significant features are incorporated into the shape of canopy 202. First, canopy 202 is generally shaped so that one or more rows 216 and 218 of spray guns 100' are enclosed within. For example, canopy 202 can have a rectangular box-like shape with an open bottom which extends below the top of conveyor 56'. By fully enclosing rows 216 and 218 of guns 100', powder leakage is prevented into the atmosphere through openings between guns 100' and the canopy. To prevent oversprayed powder from passing between the outer edges of belt 56' and side walls 230 of booth 200, strips (not shown) like strips 78,80 of the FIG. 5 embodiment can be secured to side walls 230 to seal belt 56' with respect to walls 230. Likewise, any powder which collects on the belt can be vacuumed off of the underside of the belt, as described above.

Beneath each row 216 and 218 of spray guns 100' is a baffle plate 204 and 204A, respectively. Baffle plates 204 and 204A prevent any powder which collects on guns 100' from falling onto parts 30. Baffle plates 204 and 204A are substantially rectangular and have front and rear parallel edges 220, 220A and 222, 222A, respectively. The length of baffle plates 204 and 204A is greater than the width of conveyor belt 56' so that side edges 224, 224A and 226, 226A extend past the longitudinal edges of belt 56'. Preferably, the length of plates 204, 204A is selected so that plates 204, 204A can be removably secured by conventional mechanisms (not shown) to side walls 230 of canopy 202. Moreover, the width of baffle plates 204, 204A, i.e. the distance between front edge 220, 220A and rear edge 222,222A extends from the rearward portion of gun 100' to just before the end of the flow tube 106'. Alternatively, the front edge 220, 220A of each plate 204, 204A, respectively, can extend to a distance just slightly past the tip of each flow tube 106'. Typically, baffle plates 204, 204A are constructed of a plastic material from which collected powder can easily be cleaned.

Means 232 for mounting rows 216 and 218 of guns 100' to baffle plates 204 and 204A, respectively, enables a row of guns and a corresponding baffle plate to be removed from canopy 202 as a single assembly. Means 232 includes outer gussets 234 and 236 secured to opposite baffle plate side edges 224 and 226, respectively. It is also within the terms of the invention to attach one or more additional gussets (not shown) intermediate the edges 224 and 226 of a baffle plate for additional support as needed. An oval mounting rod 238 is fixedly secured at either end to gusset 234 and 236. As best seen in FIGS. 9 and 9A, a plurality of guns 100' are secured in spaced relation to each other along the length of mounting rod 238. An adjustable mounting means 208 can mount each gun 100' at a desired location and position. Means 208 also allows individual guns 100' to be quickly and easily adjusted, added or removed without effecting the position of another gun 100'. Adjustable mounting means 208 includes a mounting block 242 having a slot 244 with a curved closed end adapted to form a sliding fit with oval mounting rod 238. A lock pin 246 is provided to secure mounting block 242 at a desired location along the length of mounting rod 238. A gun mount rod 250 which attaches gun 100' to mounting block 242 can be adjusted to set the vertical position of gun 100' with respect to the upper surface of baffle plate 204. Gun mount rod 250 can be secured in place with a lock pin 252, and each gun 100' can be rotatably adjusted with respect to the lower horizontal end of rod 250 by means of a set screw (not shown). Using this mounting arrangement, each gun 100' can be adjusted with respect to article 30 to control the angle at which powder is sprayed onto the top surface of article 30. Typically the spray angle between the longitudinal axis of gun 100' and flow tubes 106' and the plane in which the upper surface of article 30 lies is less than about 60 degrees, and preferably from about 5 to about 60 degrees, and more preferably from about 10 to about 40 degrees.

While an enabling structure is provided to mount guns 100' to baffle plates 204, 204A, it is within the terms of the invention to use any desired mounting structure which enables the guns to be adjusted and removed as a single assembly with the baffle plate.

Another design aspect of canopy 202 relates to the incorporation of a means 260 for drawing air primarily from the outlet opening 214 into the powder coating booth 200 to be mixed with oversprayed powder coating material and exhausting the mixture of air and oversprayed powder material from canopy 202. Means 260 can includes overspray exhaust ports 210 disposed downstream from the second row 218 of guns 100' and on opposite sides of conveyor 56'. Exhaust ports 210 connect to an exhaust duct 96' which has a provision for automatic recovery and recirculation of the oversprayed powder to the guns 100' by means of conventional equipment. Exhaust duct 96' is typically connected to a large fan (not shown) which draws oversprayed powder from powder coating booth 200. While exhaust ports 210 are shown as being disposed downstream from the second row 218 of guns 100', it is also within the terms of the invention to provide similarly placed exhaust ports directly downstream from each row of guns 100' in canopy 202.

Referring to FIGS. 8 and 9, restricted inlet opening 212 of canopy 202 is typically rectangular and formed as low as possible. That is, inlet opening 212 is preferably slightly higher than part 30 to provide only the necessary clearance for unrestricted movement of part 30 into powder coating booth 200. This sizing reduces or chokes off the amount of air which flows through inlet opening 212. In this way, the transfer efficiency of the powder onto part 30 is increased because only a minimal air flow is carried along by the conveyor belt to disturb the application of powder onto parts 30. An unrestricted air flow from inlet opening 212 would disrupt the spray pattern by picking up particles of powder and carrying them to exhaust ports 210 rather than allowing them to settle on parts 30. Even with the small size of inlet 212, however, the large fan which draws oversprayed powder into exhaust duct 96' could pull too much air through choked inlet opening 212 and disrupt the spray pattern of coating powder being emitted from the guns 100' if the booth were not properly configured. To eliminate this potential problem, an enlarged outlet opening 214 provides a substantially unrestricted source of air so that only a minimal flow of air is drawn through inlet opening 212.

The air being drawn into exhaust port 210 by the fan pulls the powder overspray containment air substantially entirely from large outlet opening 214 and only to a minimal extent from restricted inlet opening 212. Since the exhaust port 210 is downstream from the most downstream row of guns 100', where the final coating of powder is sprayed onto part 30, minimal disturbance of the spray pattern is caused by the containment air. This design therefore eliminates any escape of oversprayed powder since the air flowing in through the outlet 214 blocks powder from escaping at that end, and powder is moving in the opposite direction from choked down inlet end 212 so the minimal airflow into inlet 212 is sufficient to contain within the booth the small amount of powder which may migrate to inlet 212. In operation, the air velocity from outlet opening 214 to exhaust port 210 is selected as a function of the speed of conveyor 56' and the number of guns 100' in booth 200. Typically, the air velocity is between about 200 and 1000 fpm and preferably between about 200 and 500 fpm.

It is apparent that there has been provided in accordance with this invention apparatus and methods for coating a part on a flat line, powder coating system with a desired thickness of coating powder material, preferably continuously measuring the thickness of the powder coating while it is still in the precured condition and controlling the system so that the coating thickness is uniform. According to the invention, a conveyor system for transporting the article through a powder coating booth both electrically grounds the article. In one embodiment, the spray booth has a low profile design with the powder coating guns located outside of the booth and projecting into the booth at a shallow angle with respect to the conveyor transporting the article being coated through the coating spray booth. In another more preferred embodiment, the powder coating guns are located inside of the spray booth and are secured to baffle plates which prevents overspray which collects on the guns from falling on the article being coated. The spray booth used in this design includes a restricted inlet opening, an enlarged outlet opening, and an exhaust port downstream from the guns to contain the oversprayed powder without affecting the spray pattern of the powder being applied to the parts.

While the invention has been described in combination with embodiments thereof, it is evident that many alternatives, modifications, and variations will be apparent to those skilled in the art in light of the foregoing teachings. Accordingly, the invention is intended to embrace all such alternatives, modifications and variations as fall within the spirit and scope of the appended claims.

We claim:

1. A powder coating system, comprising:
   a conveyor for transferring a substantially flat article horizontally through a powder coating booth in a direction of travel;
   at least one powder spray gun for applying a layer of powder coating material in said power coating booth to said substantially flat article, said at least one powder spray gun having a spray nozzle and a charging element for charging powder coating material upstream from said nozzle, said at least one powder spray gun being disposed adjacent said conveyor at an angle of less than sixty degrees with respect to said conveyor, said at least one powder spray gun being oriented to spray powder generally in said direction of travel;
   a canopy installed above said conveyer to enclose at least a portion of said conveyor at which said powder coating material is applied to said substantially flat article;
   said at least one powder spray gun is located inside said canopy and a baffle plate is installed between said at least one powder spray gun and said article so that any powder which collects on said at least one spray gun will fall on said baffle plate and not on said substantially flat article.

2. The powder coating system of claim 1 wherein said canopy has a restricted entry opening for uncoated substantially flat articles at one end and an enlarged exit opening for coated substantially flat articles at the other end, wherein said enlarged exit opening is larger than said restricted entry opening, and wherein exhaust ports adjacent opposite sides of said conveyor are disposed within said powder coating booth between said at least one powder spray gun and said enlarged exit opening for drawing oversprayed powder from said canopy.

3. The powder coating system of claim 1 wherein said at least one powder spray gun includes two or more powder spray guns disposed adjacent one another.

4. The powder coating system of claim 1 wherein said at least one gun comprises two or more spray guns positioned in a row, each of said spray guns having two or more flow tubes connected to a downstream end of said spray guns, said two or more flow tubes arranged side by side to each other for spraying a coating of said powder coating material onto said substantially flat article.

5. The powder coating system of claim 4 wherein said two or more spray guns are disposed adjacent said conveyor for spraying said powder coating material onto said substantially flat article at an angle of less than sixty degrees with respect to said conveyor, said two or more spray guns being oriented to spray powder generally in said direction of travel.

6. The powder coating system of claim 5 wherein said two or more spray guns are disposed at an angle of between about five and forty-five degrees with respect to said conveyor.

7. The powder coating system of claim 6 wherein said two or more spray guns are disposed at an angle of between about fifteen and twenty-five degrees with respect to said conveyor.

8. The powder coating system of claim 4 wherein each of said two or more spray guns has two or more parallel, longitudinally extending flow tubes with nozzles at one end, said flow tubes being connected at a second end to said downstream end of each of said spray guns for spraying a powder coating material to form said layer of powder coating material on said substantially flat article.

9. The powder coating system of claim 8 wherein said each of said two or more spray guns is positioned with respect to adjacent spray guns so that said parallel flow tubes extending from each of said two or more spray guns are substantially equally spaced from each other.

10. The powder coating system of claim 1 wherein:
    said powder coating booth has an entry opening at one end and an exit opening at the other end;
    said conveyor includes first and second rollers and a conveyor belt mounted on said rollers so that an upper portion of said conveyor belt travels through said powder coating booth; and
    means disposed between opposite sides of said powder coating booth and said upper portion of said conveyor belt for preventing oversprayed powder coating material from escaping said powder coating booth between said upper portion of said conveyor belt and said opposite sides of said powder coating booth.

11. The powder coating system of claim 10 wherein said means for preventing oversprayed powder from escaping comprises strips secured to said opposite sides of said booth which are biased into contact with said upper portion of said conveyor belt.

12. The powder coating system of claim 11 wherein said means for preventing oversprayed powder from escaping further includes air flow channels means disposed along the length of said opposite sides of said booth above said strips to extract oversprayed powder coating material from said powder coating booth.

13. The powder coating system of claim 10 wherein said powder coating booth has at least a first substantially rectangular shaped entry section, at least a first substantially triangular shaped spray section disposed downstream and adjacent to said first entry section and at least a first overspray exhaust section located adjacent and downstream from said first spray section.

14. The powder coating system of claim 13 wherein said powder coating booth further includes a second substantially rectangular shaped entry section disposed downstream and adjacent said first overspray exhaust section, a second substantially triangular shaped spray section disposed downstream and adjacent to said second entry section, and a second overspray exhaust section located adjacent and downstream from said second spray section.

15. The powder coating system of claim 14 wherein said first triangular shaped spray section has an upstream wall disposed at an upwardly inclined angle from said first entry section, said upstream wall having one or more slots to admit air and prevent oversprayed powder coating material from collecting within said first triangular shaped spray section.

16. The powder coating system of claim 13 having at least one powder coating gun located external to said powder coating booth and having a spray barrel projecting into said first spray section for spraying said powder coating material onto said article at a spray angle of less than about 60 degrees with respect to said conveyor belt, and said gun spraying powder generally in said direction of travel.

17. The powder coating system of claim 16 wherein said at least one gun comprises two or more of said powder coating guns disposed in a first row adjacent to each other, each said internally charged, powder coating guns in said first row having a plurality of parallel flow tubes each connected to the downstream end thereof and positioned to be substantially equally spaced from adjacent tubes on either side thereof for spraying a pattern of powder coating material on said article.

18. The powder coating system of claim 1 further including a powder thickness sensor device located above said conveyor to measure the thickness of said layer of powder coating material deposited on said article while said powder coating material is still in a precured condition.

19. The powder coating system of claim 1 wherein said charging element for charging powder coating material upstream from said spray nozzle comprises a triboelectric charging device within said at least one powder spray gun.

20. The powder coating system of claim 1 wherein said at least one powder spray gun is disposed at an angle of between about five and forty-five degrees with respect to said conveyor.

21. The powder coating system of claim 20 wherein said at least one spray guns are disposed at an angle of between about fifteen and twenty-five degrees with respect to said conveyor.

* * * * *